INVENTOR.
ERNEST F. BARKHURST

United States Patent Office 3,403,585
Patented Oct. 1, 1968

3,403,585
INDEXING MECHANISM
Ernest F. Barkhurst, Euclid, Ohio, assignor to The
National Acme Company, a corporation of Ohio
Filed Sept. 22, 1966, Ser. No. 581,276
10 Claims. (Cl. 74—813)

The invention relates in general to an indexing mechanism and more particularly to a rotatable indexing mechanism for use with machine tools and the like to permit relative indexing between two rotating members, for example, for use with milling or broaching mechanisms.

The invention may be incorporated in an indexing mechanism, comprising, in combination, a shaft member, a collar member coaxial thereon and relatively rotatable therewith, first and second clutch units acting between said first and second members, said first clutch unit including first and second lug means, said second clutch unit including a third and said second lug means, said second lug means extending radially and being in a common plane substantially prependicular to said axis on one of said members, said second lug means having a total arcuate extent of less than 180 degrees, said first and third lug means being on the other of said members and being in plane parallel to each other and axially spaced apart, said first lug means being staggered peripherally from said third lug means, and means to relatively axially move said collar and shaft members whereby said second lug means cooperates alternatively with said first and third lug means with parial rotational indexing therebetween.

In many machines it is desired to relatively index in a rotational or arcuate direction two relatively rotatable members. The structure of the present invention permits such indexing movement. It has been known to provide a rotating indexing mechanism wherein two separate dog clutches are used, each dog clutch comprises a pair of clutch members for a total of four dog clutch elements. The inner two dog clutch elements are keyed to a common rotatable collar and the outer two dog clutch elements are fastened to an inner rotatable shaft. Then by moving the collar axially, one or the other pairs of dog clutch elements may be engaged. Such dog clutch elements have axially extending teeth and require the use of a total of four clutch elements.

Accordingly, an object of the present invention is to provide an indexing mechanism with a minimum number of parts.

Another object of the invention is to provide an indexing mechanism which is extremely accurate in the arcuate extent of indexing movement.

Another object of the invention is to provide an indexing mechanism wherein a high degree of accuracy is achieved because a single clutch element cooperates alternatively with two other clutch elements for a total of only three clutch elements and physically mounted on only two clutch parts.

Another object of the invention is to provide an accurate indexing mechanism which may be simply constructed and assembled.

Another object of the invention is to provide an indexing mechanism for a milling mechanism to accurately mill a flat surface on a rotating workpiece.

Other objects and a fuller understanding of the invention may be had by referring to the following description and claims, taken in conjunction with the accompanying drawings, in which:

Figure 2:
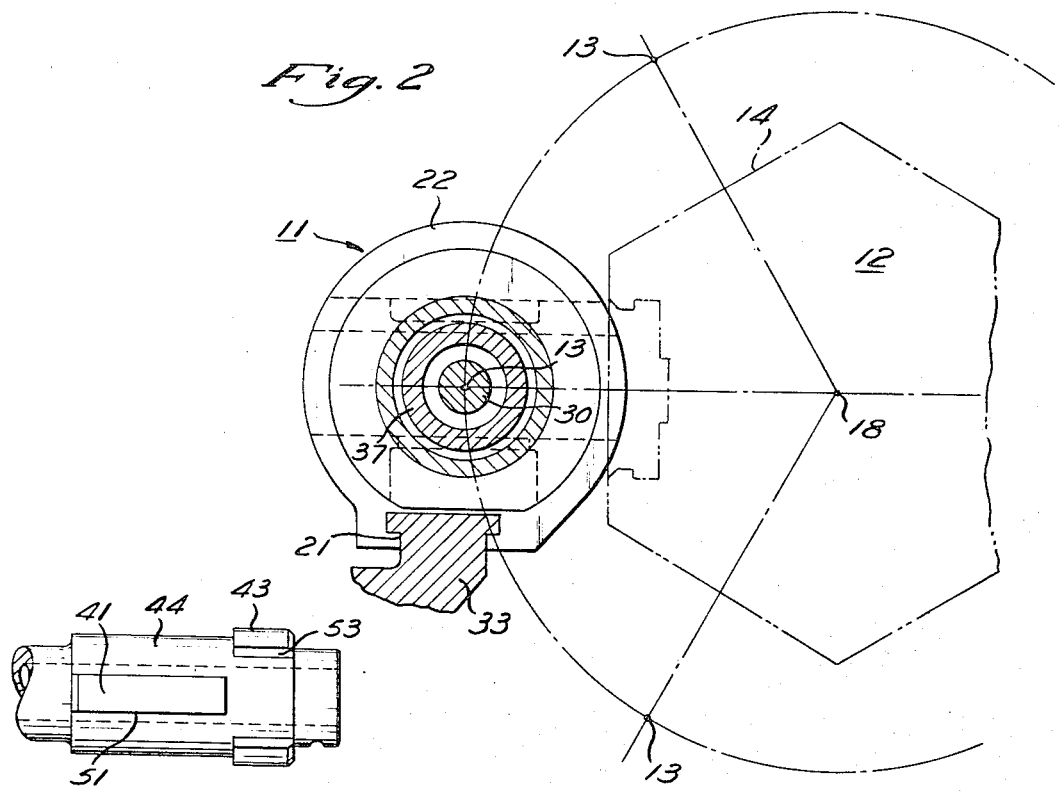
FIGURE 2 is a sectional view on line 2—2 of FIGURE 1.

The figures of the drawing show an indexing mechanism 11 as applied to a machine tool 12, in this case, a multiple spindle automatic machine. The multiple spindle machine is shown as having six spindles to rotate workpieces on the centers 13, as viewed in FIGURE 2. The machine tool 12 has a central hexagonal support 14 for carrying tools on faces thereof to cut the workpieces. The machine tool 12 has a gear box frame 16 journalling a main spindle drive shaft 17 on the axis 18, see FIGURE 2, to drive each of the spindles 19 on the centers 13.

The indexing mechanism 11 has a housing 22 mounted in a dove tail slot 21 on ways 33 mounted on the gear box frame 16 and operated independently of the central support 14 by means, not shown. In this case, the indexing mechanism 11 carries a milling head 23 with milling cutters 24 disposed on a cross shaft 25 to mill two opposing flats 26 on a workpiece 27. The cross shaft 25 is driven through gears 28 and 29 from a central shaft 30. This shaft 30 is driven in any suitable manner, such as from the gears 31 and 32 from the main spindle drive shaft 17.

Figure 3:
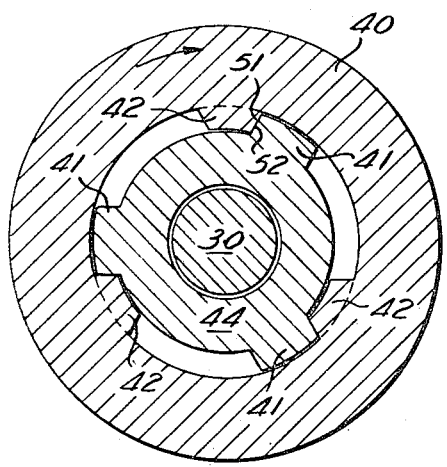
FIGURE 3 is an enlarged sectional view on line 3—3 of FIGURE 1.
Figure 4:
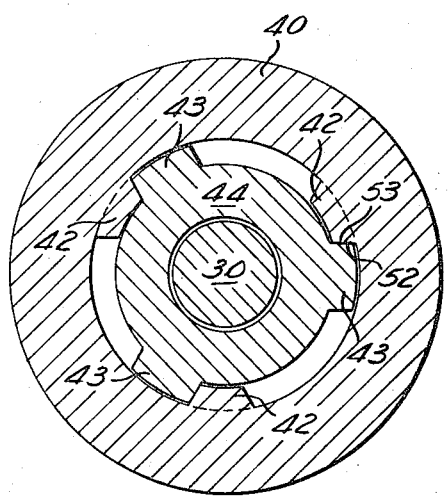
FIGURE 4 is an enlarged sectional view like FIGURE 3 with the clutch moved to a different position; and, FIGURE 5 is an elevational view of the shaft member.

The indexing mechanism 11 permits the milling head to be indexed a predetermined arcuate extent relative to the workpiece 27 while both the milling head 23 and the workpiece 27 are rotating. The spindle drive shaft 17 drives through gears 35 and 36 of any desired ratio. However, this ratio is identical to the ratio driving each spindle 19 from the spindle drive shaft 17, through gearing not shown. This means that gear 36 rotates at the same speed and rotation as the spindle 19 and workpiece 27. The milling head 23 is rotated by being fastened to a hollow shaft 37 journalled at 38 in the housing 22. The hollow shaft 37 is splined to an external spline shaft 39 on which the gear is journalled. As best shown in FIGURES 3, 4 and 5, the gear 36 has a collar member 40 which is partially rotatable on and partially axially slidable on the shaft member 44 fixed as an extension to the external spline shaft 39. There are first and second clutch units acting between the collar member 40 and the shaft member 44. The first clutch unit includes first and second lug means each of which is a series of lugs 41 and 42, respectively. The second clutch unit includes said second lug means 42 and third lug means 43 which also includes a series of lugs. The first clutch unit 41-42 acts between the collar member 40 and shaft member 44, and the second clutch unit 42-43 also acts between the collar member 40 and shaft member 44. These two clutch units have in common the second lug means 42, which are radially directed lugs directed inwardly on the inner periphery of the collar member 40. These three lugs are equidistantly spaced and in this embodiment, are of about 30 degrees arcuate extent. The first and third lug means 41 and 43, respectively, are fixed on the shaft member 44. Each of these lug means includes three lugs equidistantly spaced and in this particular embodiment are approximately 30 degrees arcuate extent. The first lug means 41 are staggered peripherally from the third lug means 43. In this preferred embodiment, the first lug means 41 are staggered equidistant between the third lug means and in this particular case of three lugs each 30 degrees in arc, the first lugs are disposed 60 degrees out of phase relative to the third lugs 43. The first and third lugs 41 and 43 project radially outwardly and each of the lugs has a generally radially disposed engaging face 51 and 53, respectively.

Figure 1:
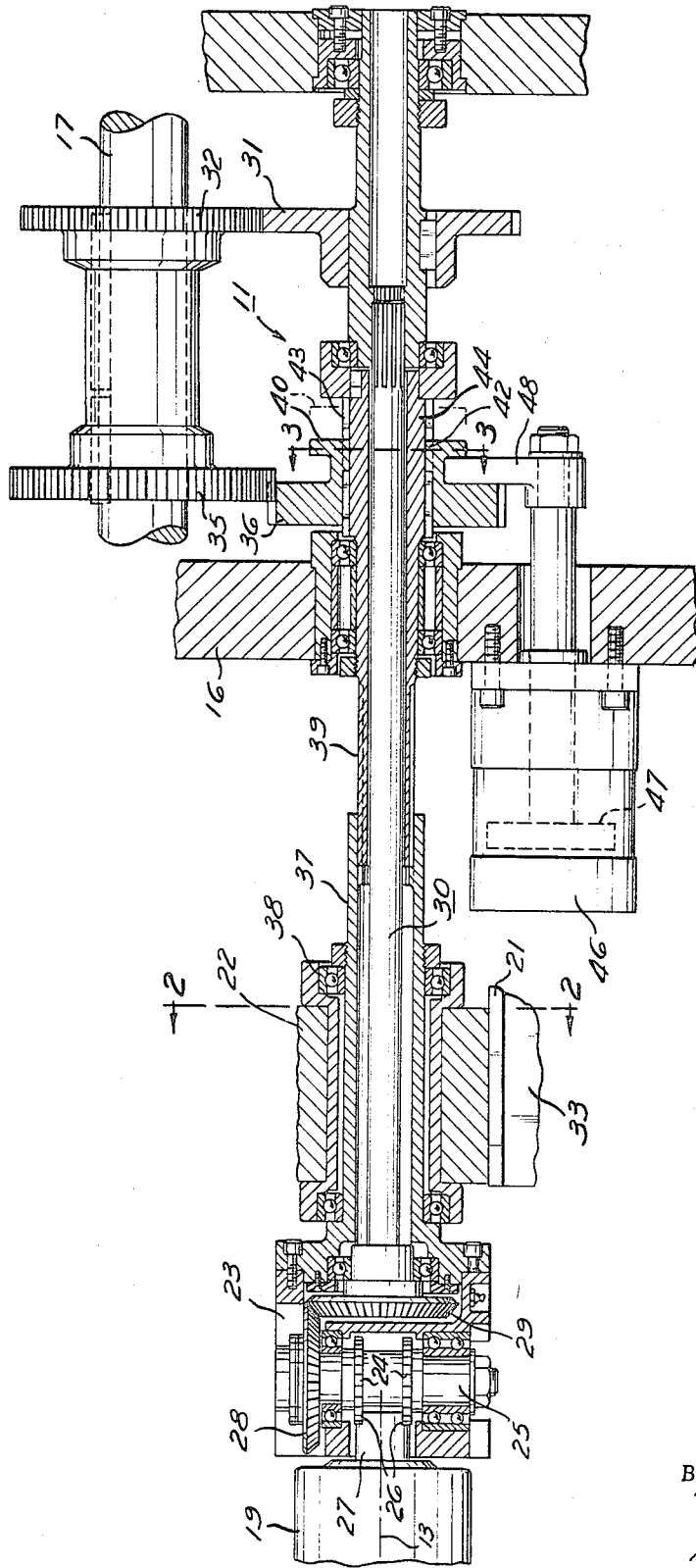
FIGURE 1 is a sectional view through an indexing mechanism incorporating the invention.

A fluid cylinder 46 and piston 47 actuates a yoke 48 to move the collar member 40 axially. The gears 35 and 36 have sufficient width of teeth to permit this axial movement of gear 36 while remaining in mesh. The axial shifting of collar member 40 changes the interengagement of lugs 42 between the lugs 41 and the lugs 43. In the position shown in FIGURES 1 and 3, lugs 42 interengage with lugs 41 at the engaging faces 51 and 52 with collar member 40 driving clockwise, for example. When the yoke 48 is shifted to the right, as viewed in FIGURE 1, then the lugs 42 will no longer be driving the lugs 41. The friction to rotation of the milling head 23 will mean that the milling head will slow down and hence shaft member 44 will turn counterclockwise, as viewed in FIGURE 4, so that faces 53 on the lugs 43 will come into engagement with faces 52 on the lugs 42. This will effect a rotational indexing of 60 degrees in this case between the milling head 23 and the workpiece 27. This indexing would take place at the time when the milling head 23 has been retracted axially away from workpiece 27 by movement of housing 22 in dovetail slot 21 by means not shown. When next the housing 22 and milling head 23 are advanced toward the workpiece 27, head 23 will then have been indexed 60 degrees, and thus the milling cutters 24 will cut another pair of opposed flats 26 on the workpiece 60 degrees from the previously milled flats. A second indexing with the milling head 23 retracted and a subsequent head advancement would permit milling a complete hexagon on the workpiece 27.

The fact that the engaging faces 50 on the lugs 42 cooperate alternatively first with the first lugs 41 and next with the third lugs 43 means that the indexing is precisely controlled in arcuate extent. Prior art indexing mechanisms had difficulty in achieving precise indexing where a first pair of indexing dog clutch elements was used for part of the index and a second pair of dog clutch elements was used for a second index. There was the difficulty in precisely coordinating the angle of the engaging faces on the two inner dog clutch elements of the total of four.

The second lugs 42 have a total arcuate extent of 90 degrees in this embodiment which is less than 180 degrees and similarly the first and third lugs 41 and 42 also each have a total arcuate extent of 90 degrees. This permits, in connection with the 30 degrees arcuate extent of each lug, a 90 degree spacing between lugs on the first and third lug means 41 and 43. This gives a large 90 degree space into which the 30 degree lugs of the second lug means 42 may axially slide.

The second lug means 42 is shown on the collar member 40 and the first and third lug means 41 and 43 are shown in the shaft member 44. However, these relative positions may be interchanged. Each of the lug means, as shown, includes three lugs although this may be any plural number or in fact may be only one lug for each of the lug means, depending on torque requirements and angle of indexing desired. The collar member 40 and shaft member 44 are relatively rotatable and in this particular instance of a rotating milling head 23, both members are rotatable. The collar member 40 and shaft member 44 are relatively axially movable and in this particular case, it is the collar member 40 which is axially moved.

The fact that the second lug means 42 is common to both first and third lug means 41–42 and 42–43, assures a high degree of indexing accuracy. In the milling head 23 illustrated, it is extremely important that the flats milled be exactly 60 degrees from the preceding flats which have been milled. The fact that the engaging faces 52 on the lug means 42 are always those which establish the indexing position, this indexing mechanism 11 is able to maintain an extremely high degree of accuracy in the arc through which the mechanism is indexed.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to with out departing from the spirit and the scope of the invention as hereinafter claimed.

What is claimed is:

1. An indexing mechanism, comprising, in combination, a shaft member having an axis,
a collar member coaxial thereon and relatively rotatable therewith,
first and second clutch units acting between said first and second members,
said first clutch unit including first and second lug means,
said second clutch unit including a third and said second lug means,
said second lug means extending radially and being in a common plane substantially perpendicular to said axis on one of said members,
said second lug means having a total arcuate extent of less than 180 degrees,
said first and third lug means being on the other of said members and being in planes parallel to each other and axially spaced apart,
said first lug means being staggered peripherally from said third lug means,
and means to relatively axially move said collar and shaft members whereby said second lug means cooperates alternatively with said first and third lug means with partial rotational indexing therebetween.

2. An indexing mechanism as set forth in claim 1 wherein each of said first, second and third lug means is a series of lugs with lugs in each series equidistantly spaced on the periphery of the member carrying the respective lugs.

3. An indexing mechanism as set forth in claim 1 wherein each said first and third lug means has a total arcuate extent of less than 180 degrees,
and the total arcuate extent of said first, second and third lug means is less than 360 degrees.

4. An indexing mechanism as set forth in claim 1 wherein each said shaft member and said collar are rotatable.

5. An indexing mechanism as set forth in claim 1 wherein said first lug means is displaced peripherally equidistant said third lug means.

6. An indexing mechanism as set forth in claim 1 wherein said first, second and third lug means have generally radially extending faces disposed for interengagement during indexing.

7. An indexing mechanism as set forth in claim 1 wherein said planes of said first and third lug means are substantially perpendicular to said axis.

8. An indexing mechanism as set forth in claim 1 wherein said second lug means is disposed on said collar member and said first and third lug means are disposed on said shaft member,
and means to axially move said collar member to effect the indexing movement.

9. An indexing mechanism as set forth in claim 1 wherein each said first, second and third lug means includes three radially extending lugs each of approximately 30 degrees arcuate extent,
the thre lugs in each of said first, second and third lug means being equidistantly spaced on the periphery of the member carrying same,
said first lug means being staggered peripherally 60 degrees from said third lug means, whereby said collar and shaft members relatively index approximately 60 degrees upon the second lug means changing cooperation from said first lug means to said third lug means.

10. An indexing mechanism, comprising, in combination, a first rotatable shaft member, a second rotatable collar member coaxial therewith,
first and second clutch units acting between said first and second rotatable members,
said first clutch unit including a first and a second series of lugs,
said second clutch unit including said second and a third series of lugs,
said second series of lugs being radially inwardly directed lugs on said collar member and equidistantly spaced on the inner periphery of said collar member,
said second series of lugs being three in number and each having an arcuate extent of approximately 30 degrees,
said first series of lugs being radially outwardly extending on said shaft member,
each of said lugs in said first series being equidistantly spaced around the periphery of said shaft member and being three in number each of approximately 30 degrees arcuate extent,
said first and third series of lugs on said shaft member being in planes parallel to each other and separated axially on said shaft member,
said first series of lugs being displaced peripherally 60 degrees from the lugs in said third series,
and means to move said collar member axially along said shaft member whereby said lugs in said second series may cooperate alternatively with the lugs in said first and third series with partial rotational indexing of approximately 60 degrees between said shaft member and said collar member as said collar member second series of lugs alternates in cooperation between said first and third series of lugs.

References Cited

UNITED STATES PATENTS

| | | | |
|---|---|---|---|
| 1,036,720 | 8/1912 | Robinson | 74—817 |
| 2,889,712 | 6/1959 | Early | 74—125.5 |

FRED C. MATTERN, JR., *Primary Examiner.*

B. T. CALLAHAN, *Assistant Examiner.*